July 10, 1956
J. J. FITZMAURICE
2,753,976
ALIGNING CONVEYOR SYSTEM
Filed Nov. 25, 1952
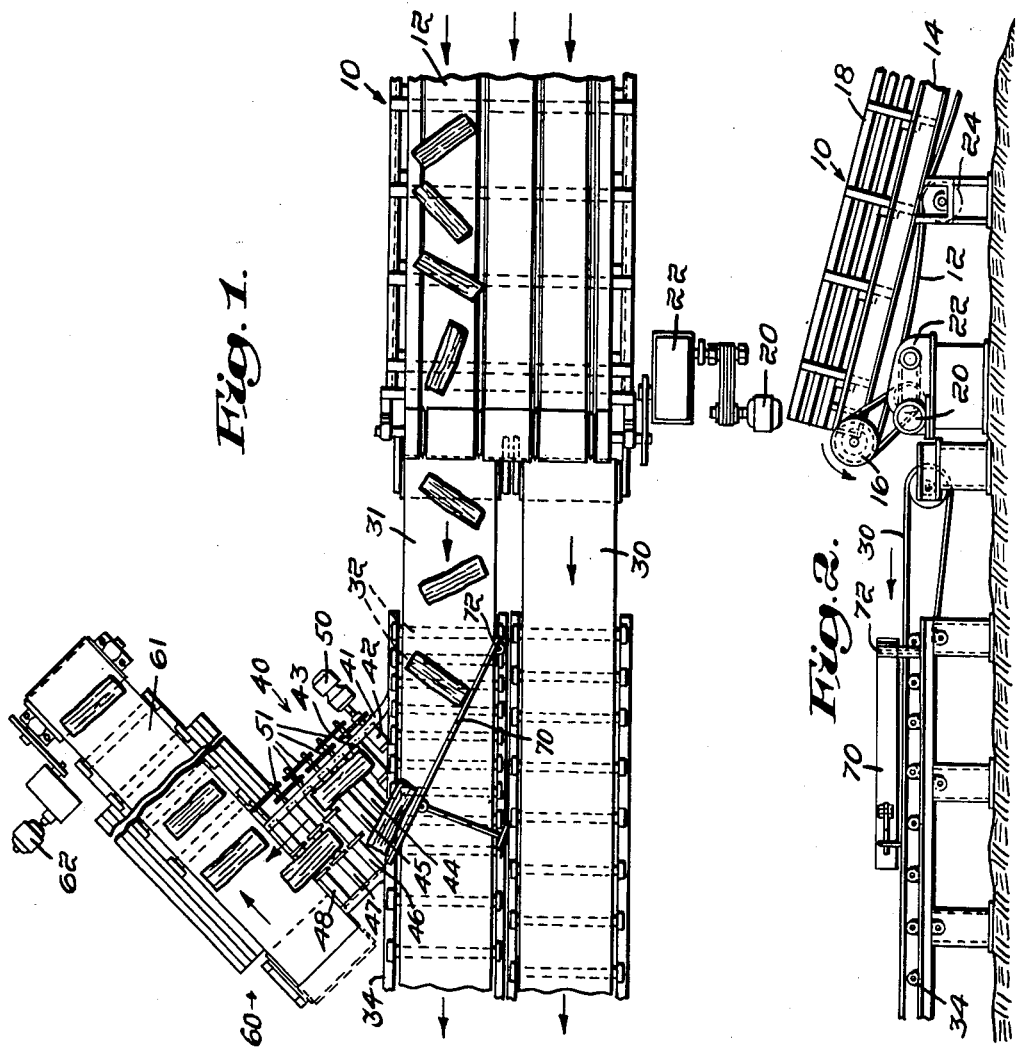
Inventors:
John J. Fitzmaurice
Rowland V. Patrick
by
Attorney United States Patent Office 2,753,976
Patented July 10, 1956

2,753,976

ALIGNING CONVEYOR SYSTEM

John J. Fitzmaurice, Montreal, Quebec, Canada, assignor to Brown Company, Berlin, N. H., a corporation of Maine Application November 25, 1952, Serial No. 322,440

6 Claims. (Cl. 198—33)

This invention relates to a conveyor system and more specifically to a novel aligning unit which is adapted to align elongated articles, such as pulpwood logs which are advancing successively along an infeed conveyor with their longitudinal axes disposed at random, so that the logs may be subsequently more readily handled, or fed in orderly fashion to subsequent machines in the pulping operation, such as barkers or chippers.

A specific embodiment of the invention is particularly useful in the mechanized hauling of logs from the water. Custom has it, in pulp lumbering operations, to cut logs in four-foot lengths and carry them in the spring river flow to supply pools adjacent the pulping mill. Mechanized handling of the logs from this point on may include the provision of an endless belt inclined chain conveyor, one end of which is lowered into the supply pool. The floating logs are successively moved into contact with the moving belt of this conveyor which then hauls them from the water but they are, as thus handled, randomly disposed on the conveyor belt. The handling of the random logs from the discharge end of this conveyor is the particular concern of this invention and, in the embodiment to be described, there is provision not only for aligning wanted logs but also for causing, by manual selection, unwanted logs to be diverted from the path of the wanted logs though such selective diversionary device is not an essential part of this invention.

The invention hereof may be readily understood by reference to the accompanying drawings, wherein:

Fig. 1 is a plan view of the apparatus of the invention with portions thereof broken away to indicate extent; and Fig. 2 is a side elevational view of the apparatus shown in Fig. 1.

The reference numeral 10 is generally indicative of an inclined chain conveyor of conventional construction which drives a series of parallel endless belts 12, which, in the embodiment shown, are three in number, in the direction indicated by the arrows. These belts 12 are supported on a suitable frame 14 and pass over infeed end pulleys 16. The composite moving surface formed by these three belts is bounded on each side by wooden retaining walls 18 and suitable driving mechanism is provided for the parallel chains, including motor 20 and reduction gear box 22. Suitably supported idlers 24 are also provided for the return traverse of the belts.

The discharge end of conveyor 10 is elevated over the end of a pair of slightly wider parallel endless belts 30 and 31 which are conveniently driven at a greater speed than that of the inclined conveyor belts 12.

The belts 30 and 31 are supported by a series of parallel idler rollers 32 suitably journalled in longitudinal side frames 34.

Attached to one of the side frames 34 is an aligning unit generally indicated at 40, including a pair of journal supporting frames 41 which are parallel but of unequal length and which provide therebetween a traverse which is oblique with respect to the traverse of the main conveyor belt 31. Journalled in outer bearings spaced along the outer frame 41 and in inner bearings spaced along the outside of side frame 34 of the main conveyor, and also spaced along the other frame 41, is a series of parallel spaced rollers. Side frame 34 in effect, therefore, doubles as an oblique end frame for conveyor unit 40.

Because of the angle of the parallel frames 41 and the direction of the axes of the rollers, the inner roller 42 of this series is relatively short and is followed by four rollers 43, 44, 45 and 46 of progressively increasing length, the last two rollers 47 and 48 being of the same length as roller 46. Thus, the inside ends of the first five rollers 42 to 46 are closely adjacent to the edge of the conveyor belt 31.

The rollers 42 to 48 of the aligning conveyor 40 are, in the form shown, driven by a motor 50 through a train of gears 51, the individual gears of which are so designed that each successive roller has an increasing peripheral speed. For example, if the main conveyor is advancing at 200 feet per minute, a desirable surface speed for the successive rollers 42—48 can be, for example, 256, 329, 400, 470, 537, 608 and 680 feet per minute, respectively. It will be understood that all seven of these rollers rotate in paths which are below and tangential to a horizontal plane substantially the same as or parallel to the plane of the conveyor belt 31.

The discharge end of the aligning conveyor unit 40 is adjacent a cross-conveyor unit 60 of conventional construction which has a belt 61 advancing in the direction of the arrow and as driven by motor 62.

Positioned across the path of the logs as they advance on conveyor 31 is a deflector 70 which can be hinged on a vertical axis to one of the side frames 34, as at 72. In the position of the deflector 70 shown in Fig. 1, it acts to divert logs as they advance along belt 31 laterally of the belt until portions thereof come into contact with one or more of the adjacent rollers 42—46. The increased surface speeds of these rollers then tends to pull the leading end of the log towards the discharge end of the aligning conveyor unit 40 with the trailing end lagging and thus align the logs in a direction normal to the axes of the rollers 42–48; and they are discharged onto the conveyor belt 61 for advance therealong in successive substantially parallel cross-wise relation, particularly when the conveyor unit 60 is operated at about one-half the speed of the conveyor 31, say, at 100 feet per minute, so that its slower speed insures that the alignment procured on the aligning conveyor will not be substantially disturbed as the logs are transferred onto belt 61. Since the logs, in the example given, are being discharged from unit 40 at the rate of 680 feet per minute, it will take only 4/680 of a minute to discharge each four-foot log and during this time interval conveyor 60 will have advanced only 4/680 of 100 feet or 10/17 of a foot or approximately seven inches. This would at most cause only an 8 or 9° offset from lateral alignment.

By reason of the provision of hinge 72, selected logs advancing on belt 31 may be allowed to by-pass the unit 40 either by hand or power manipulation of the deflector 70. If desired, the aligning unit 40 and deflector 70 may be duplicated further down the traverse of conveyor 31 and thus act to by-pass onto another conveyor unit duplicating unit 60 some or all of the logs which advance beyond the first withdrawn deflector 70.

The conveyor 30 is provided in order to increase handling capacity and has a traverse which continues beyond the discharge end of conveyor 31 so that it too can be provided with one or more deflectors 70 and adjacent aligning conveyor units 40.

In fact, the duplication may be carried to any point required for handling any number of logs per minute.

If desired, any of the belts 12, 30, 31 and 61 may be provided with suitable lugs, caulks or spikes of conventional and known construction for minimizing slippage of the logs and any one or more of the rollers 42—48 can likewise be provided with frictional surfaces in the form of lugs, caulks or spikes for the same purpose. However, I have found it helpful to provide the rolls 42—48 with spaced annular projections which tend to aid in the aligning action by preventing already aligned logs from losing their alignment.

I claim:

1. In a conveyor system for pulpwood logs and the like, means for carrying logs and the like along a straight main traverse and a diversion roller conveyor for aligning said logs as they advance, said conveyor extending away from one side of said traverse at an angle thereto, said roller conveyor comprising a series of parallel spaced rollers having paths of rotation below and tangential to a common plane and means for driving succeeding rollers of said series, progressing away from said main traverse, at progressively increasing peripheral speeds, and deflector means for successively diverting logs and the like advancing along said main traverse sideways off said main traverse onto said rollers to be carried along said aligning conveyor under the influence of the aligning tendency of said differential speed rollers.

2. A conveyor system as claimed in claim 1, wherein the peripheral speed of the roller having the slowest peripheral speed exceeds the linear speed of advance of logs along said main traverse.

3. A conveyor system as claimed in claim 1, having a cross conveyor at the discharge end of said aligning conveyor for receiving and carrying logs aligned on said aligning conveyor transversely away from the discharge end of said aligning conveyor.

4. A conveyor system as claimed in claim 3, wherein the peripheral speed of the roller having the slowest peripheral speed exceeds the linear speed of advance of logs along the main traverse, and means for driving said cross-conveyor at a linear speed less than said main traverse linear speed.

5. In a conveyor system for pulpwood logs and the like, means for carrying logs and the like along a straight traverse and a diversion roller conveyor for aligning said logs as they advance, said conveyor extending away from one side of said traverse at an angle thereto, said roller conveyor comprising a series of parallel spaced rollers having paths of rotation below and tangential to a common plane, and axes extending obliquely with respect to the direction of said main traverse, inner ends of rollers in said series being journalled in bearings spaced in alignment along the side of said main traverse and parallel thereto, and means for driving succeeding rollers of said series, progressing away from said main traverse, at progressively increasing peripheral speeds and deflector means for successively diverting logs and the like advancing along said main traverse sideways off said main traverse onto said rollers to be carried along said aligning conveyor under the influence of the aligning tendency of said differential speed rollers.

6. A conveyor system as claimed in claim 5, wherein the rollers journalled in said bearings are of increasing length and have their other ends journalled in bearings spaced in alignment and progressively diverging away from said main traverse.

References Cited in the file of this patent

UNITED STATES PATENTS

| | | |
|---|---|---|
| 770,260 | Cahill | Sept. 20, 1904 |
| 1,649,304 | Gray | Nov. 15, 1927 |
| 1,693,014 | Anderson | Nov. 27, 1928 |
| 1,719,305 | Pardee | July 2, 1929 |
| 1,737,829 | Cosgrove | Dec. 3, 1929 |
| 1,828,232 | Rowe | Oct. 20, 1931 |